US010650555B2

United States Patent
Chae et al.

(10) Patent No.: US 10,650,555 B2
(45) Date of Patent: May 12, 2020

(54) IMAGING SYSTEM AND IMAGE RECONSTRUCTION METHOD USING THE SAME

(71) Applicant: ELECTRONICS AND TELECOMMUNICATIONS RESEARCH INSTITUTE, Daejeon (KR)

(72) Inventors: Byung Gyu Chae, Daejeon (KR); Yoon Seon Song, Daejeon (KR); Sung Woong Shin, Daejeon (KR); SooYeul Lee, Daejeon (KR); Hyo Bong Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 63 days.

(21) Appl. No.: 15/996,051

(22) Filed: Jun. 1, 2018

(65) Prior Publication Data
US 2018/0350111 A1    Dec. 6, 2018

(30) Foreign Application Priority Data

Jun. 1, 2017    (KR) .......................... 10-2017-0068635

(51) Int. Cl.
*G06K 9/00*    (2006.01)
*G06T 11/00*    (2006.01)
(52) U.S. Cl.
CPC .......... *G06T 11/003* (2013.01); *G06T 11/006* (2013.01)

(58) Field of Classification Search
CPC ................ G06T 11/003; G06T 11/006; G06T 2211/416; A61B 5/0515
See application file for complete search history.

(56) References Cited

U.S. PATENT DOCUMENTS

| | | | | |
|---|---|---|---|---|
| 6,844,378 B1 * | 1/2005 | Martin | ................... | B82Y 25/00 204/557 |
| 8,824,763 B2 | 9/2014 | Jeon et al. | | |
| 9,215,990 B2 | 12/2015 | Rahmer et al. | | |
| 2010/0127707 A1 | 5/2010 | Lee et al. | | |

(Continued)

FOREIGN PATENT DOCUMENTS

JP    5970470    8/2016

OTHER PUBLICATIONS

Weizenecker, et al., "A Simulation Study on the Resolution and Sensitivity of Magnetic Particle Imaging," Phys. Med. Biol., 2007, vol. 52 (21), pp. 6363-6374.

*Primary Examiner* — Tom Y Lu (57) ABSTRACT

Provided are an image system and an image reconstruction method using the same. The image system includes an image scan device, a spectrum signal generation device, and an image recovery device. The image scan device generates a magnetic particle detection signal on the basis of an induced magnetic field induced from a magnetic particle. The spectrum signal generation device transforms the magnetic particle detection signal to a detection spectrum signal on the basis of a two-dimensional Fourier transform kernel. The image recovery device generates an image signal on the basis of the detection spectrum signal and a system matrix. According to the inventive concept, a data amount for image reconstruction may be ensured.

14 Claims, 6 Drawing Sheets

(56) References Cited

U.S. PATENT DOCUMENTS

| | | | |
|---|---|---|---|
| 2011/0246103 A1* | 10/2011 | Rahmer | ............... A61B 5/05 702/57 |
| 2013/0253304 A1 | 9/2013 | Bontus et al. | |
| 2015/0015247 A1 | 1/2015 | Goodwill et al. | |

* cited by examiner

IMAGING SYSTEM AND IMAGE RECONSTRUCTION METHOD USING THE SAME

CROSS-REFERENCE TO RELATED APPLICATIONS

This U.S. non-provisional patent application claims priority under 35 U.S.C. § 119 of Korean Patent Application No. 10-2017-0068635, filed on Jun. 1, 2017, the entire contents of which are hereby incorporated by reference.

BACKGROUND

The present disclosure herein relates to a medical imaging system and more particularly, to an imaging system and an image reconstruction method using the same.

An imaging system capable of imaging the inside of a human body without dissecting the human body is being getting the spotlight in disease diagnosis, health examination or the like, in a medical field. Such an imaging system may obtain an image inside the human body using features that certain energy is emitted to the human body and the energy is permeated through or reflected by the human body according to characteristics inside the human body. For example, the imaging system may include an X-ray imaging device, an ultrasonic image device, a Computed Tomography (CT) device, or a Magnetic Resonance Imaging (MRI) device, etc.

A typical imaging system has a limitation in radiation exposure or difficulty of acquisition of a high resolution image, etc. Recently, a Magnetic Particle Imaging (MPI) device is emerging as a next-generation imaging system capable of using a superparamagnetic nanoparticle as a tracer to rapidly acquire a biological image of high resolution. The MPI device may acquire a spectrum including a plurality of harmonics from an electric signal induced from a nanomagnetic particle (hereinafter, a magnetic particle). However, such a spectrum is concentrated in a relatively low frequency band. Accordingly, it is required to recover an accurate image from such signal characteristics.

SUMMARY

The present disclosure provides an image system having an improved image recovery performance by acquiring many pieces of spectrum data, and an image reconstruction method using the same.

An embodiment of the inventive concept provides an image system includes an image scan device, a spectrum signal generation device, and an image recovery device. The image scan device generates a magnetic particle detection signal on the basis of an induced magnetic field induced from a magnetic particle. The image scan device may detect the magnetic particle detection signal along a Lissajous trajectory.

In an embodiment, the image scan device may include a magnetic field providing unit, a magnetic field providing unit, and a scan control unit. The magnetic providing unit may apply an AC magnetic field to the magnetic particle. The induced signal detection unit may detect the induced magnetic field induced from the magnetic particle. The scan control unit may control a detection area of the induced magnetic field. The magnetic field providing unit may include a first driving coil configured to apply a first AC magnetic field in the first direction. The scan control unit may include a second driving coil configured to apply a second AC magnetic field in the second direction; and a selection coil configured to control the detection area. The scan control unit may control a frequency of the second AC magnetic field to form the Lissajous trajectory in the detection area.

In an embodiment, the spectrum signal generation device may transform the magnetic particle detection signal to a detection spectrum signal on the basis of a two-dimensional Fourier transform kernel. The spectrum signal generation device may transform the magnetic particle detection signal so as to have a waveform repeated as many as the number of Lissajous cycles that is defined as the number of times of back-and-forth passes in the first direction during one period of the Lissajous trajectory. The spectrum signal generation device may generate the system matrix on the basis of the two-dimensional Fourier transform kernel.

In an embodiment, the two-dimensional Fourier transform kernel may be generated by Kronecker delta multiplication of a first matrix and a second matrix. The first matrix may be generated based on a first directional component of the magnetic particle detection signal. The second matrix may be generated based on a second directional component of the magnetic particle detection signal. The first direction and the second direction may be perpendicular to each other. The spectrum signal generation device may generate the detection spectrum signal on the basis of matrix multiplication calculation of the column vector and the two-dimensional Fourier transform kernel.

In an embodiment, the image recovery device may generate an image signal on the basis of the detection spectrum signal and a system matrix. The number of a plurality of spectrum ranges may be identical to the number of Lissajous cycles. The image recovery device may include a data extraction unit and an image reconstruction unit. The data extraction unit may extract spectrum data having a magnitude equal to or greater than a threshold value. The image reconstruction unit may generate the image signal on the basis of the spectrum data.

In an embodiment of the inventive concept, an image reconstruction method may include: detecting a magnetic particle detection signal; generating a detection spectrum signal; and generating a system matrix; and generating an image signal. The detecting of the magnetic particle detection signal may include: applying an AC magnetic field to a magnetic particle; and scanning an induced magnetic field induced from a magnetic particle along a Lissajous trajectory on the basis of the AC magnetic field.

In an embodiment, the detection spectrum signal may be generated by calculating a two-dimensional Fourier transform kernel and a column vector of the magnetic particle detection signal with respect to time. The detection spectrum signal may have a plurality of spectrum ranges in which spectrum data has a magnitude equal to or greater than a threshold value. The number of the plurality of spectrum ranges may correspond to the number of Lissajous cycles. The system matrix may be generated based on the two-dimensional Fourier transform kernel. The image signal may be generated based on the detection spectrum signal and the system matrix.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, an exemplary embodiment of the inventive concept will be described in detail with reference to the accompanying drawings such that a person skilled in the art may easily carry out the embodiments of the inventive concept.

Figure 1:
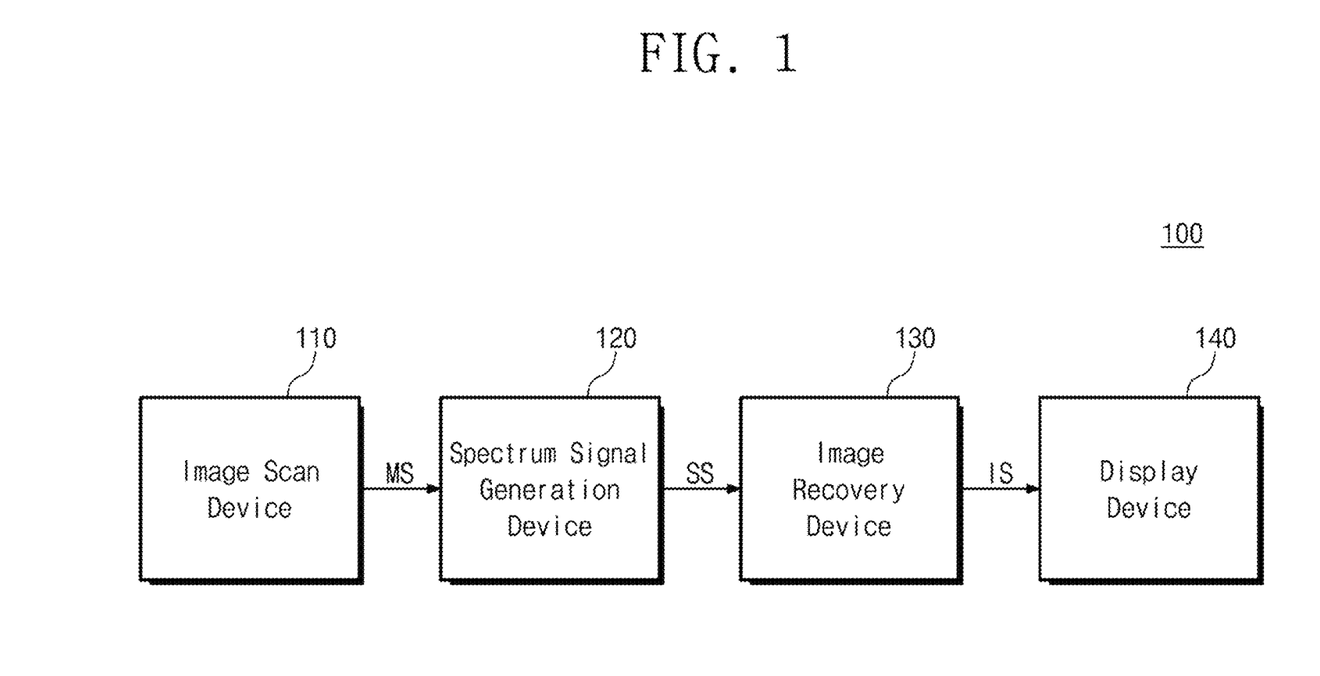
FIG. 1 is a block diagram of an imaging system according to an embodiment of the inventive concept.

FIG. 1 is a block diagram of an imaging system according to an embodiment of the inventive concept. In relation to FIG. 1, the imaging system 100 includes an image scan device 110, a spectrum signal generation device 120, an image recovery device 130, and a display device 140. The imaging system 100 may acquire an image for a specific thing or object. The image scan device 110 may be a Magnetic Particle Imaging (MPI) device, and hereinafter, it is assumed that the image scan device 110 is the MPI device. However, an embodiment of the inventive concept is not limited thereto, and the image scan device 110 may be one of various medical imaging devices configured to achieve the purpose of the inventive concept.

The image scan device 110 provides an AC magnetic field to an object. The image scan device 110 generates a magnetic particle detection signal MS on the basis of an induced magnetic field induced from a magnetic particle formed in the object. The image scan device 110 uses a magnetic particle as a tracer. The image scan device 110 may scan a distribution of magnetic particles using nonlinear magnetization characteristics of a superparamagnet. For example, a contrast medium including a magnetic particle may be injected to the object. The image scan device 110 may provide an AC magnetic field to the magnetic particle included in the contrast medium, and the magnetic particle may generate an induced magnetic field induced by the AC magnetic field.

The image scan device 110 detects the induced magnetic field. The image scan device 110 may detect the induced magnetic field provided in a detection area. The detection area may be provided under a control of the image scan device 110. The image scan device 110 may detect the induced magnetic field in a Lissajous scan manner. The image scan device 110 may detect the induced magnetic field generated from the magnetic particle formed at a specific location along a Lissajous trajectory. An electric field is induced based on the induced magnetic field generated by the magnetic particle. In other words, the magnetic particle detection signal MS may be an induced electric field. The magnetic particle detection signal MS may indicate a voltage value applied to the image scan device 110 as time passes. A detailed configuration of the image scan device 110 may be described later in detail with reference to FIG. 2.

The spectrum signal generation device 120 receives the magnetic particle detection signal MS from the image scan device 110. The spectrum signal generation device 120 transforms the magnetic particle detection signal MS to a detection spectrum signal SS using a two-dimensional Fourier transform kernel. In other words, the magnetic particle detection signal MS may be an electrical signal in a time domain and the detection spectrum signal SS may be the electrical signal in a frequency domain. The spectrum signal generation device 120 may generate the detection spectrum signal SS through the two-dimensional Fourier transform.

The two-dimensional Fourier transform kernel may be a matrix configured to perform the Fourier transform on the magnetic particle detection signal MS. The magnetic particle detection signal MS may be converted to a column vector type according to time. The detection spectrum signal SS may be provided by matrix multiplication of the two-dimensional Fourier transform kernel and the magnetic particle detection single MS converted to the column vector. The spectrum signal generation device 120 may include an analog-to-digital converter so as to digitally convert the magnetic particle detection signal MS, which is an electrical signal. The analog-to-digital converter may digitally convert the magnetic particle detection signal MS to digitize as a discrete value. The magnetic particle detection signal MS may be converted to a row vector type for matrix calculation on the basis of the digitized discrete value. However, an embodiment of the inventive concept is not limited thereto, and the spectrum signal generation device 120 may generate the detection spectrum signal SS using an analog signal.

The spectrum signal generation device 120 may generate a system matrix. The system matrix may be used for mapping the detection spectrum signal SS and the magnetic particle distribution for image recovery. The system matrix may be generated on the basis of various variables such as magnetization characteristics of a magnetic particle, and a geometrical structure or image acquisition condition of the image scan device 110. Like the detection spectrum signal SS, the system matrix may be generated using the two-dimensional Fourier transform kernel. The spectrum signal generation device 120 may transform a signal measured by scanning directly and spatially the magnetic particle to generate the system matrix. However, an embodiment of the inventive concept is not limited thereto, and the system matrix may be generated on the basis of a mathematical model such as a convolution with a basis of Chebyshev Polynomials and the derivative of the Langevin function.

The spectrum signal generation device 120 performs a matrix calculation using the two-dimensional Fourier transform kernel. The spectrum signal generation device 120 may include an electronic circuit configured to perform such a matrix calculation. For example, the spectrum signal generation device 120 may include storage configured to store element values of the two-dimensional Fourier transform kernel and a multiplication calculator configured to perform matrix multiplication calculation. However, an embodiment of the inventive concept is not limited thereto, and the spectrum signal generation device 120 may acquire the magnetic particle detection signal MS over time and generate the detection spectrum signal SS through software calculation under the control of the processor. In FIG. 1, the spectrum signal generation device 120 is arranged as a separate component, but an embodiment of the inventive concept is not limited thereto, and the spectrum signal generation device 120 may be included in the image recovery device 130.

The image recovery device 130 receives the detection spectrum signal SS from the spectrum signal generation device 120. The image recovery device 130 may receive the system matrix from the spectrum signal generation device 120. The image recovery device 130 may generate an image signal IS on the basis of the detection spectrum signal SS and the system matrix. The image recovery device 130 reconstructs an image for the detected object on the basis of the detection spectrum signal SS and the system matrix. For example, the image recovery device 130 may acquire the image signal IS by obtaining a solution for Equation (1).

$$V_n = \int_{FOV} S_n(x)C(x)dx \quad (1)$$

$$\|S_c - v\|_2^2 + \lambda\|c\|_2^2 \xrightarrow{c} \min$$

Referring to Equation (1), Vn is defined as the detection spectrum signal SS corresponding to a spectrum distribution of the magnetic particle detection signal MS. Sn(x) is defined as a system matrix of the imaging system 100. C(x) is defined as a reconstructed image signal IS. In other words, the image signal IS, C(x) may be acquired by obtaining a solution of a linear system problem like Equation (1).

The display device 140 receives the image signal IS from the image recovery device 130. The display device 140 may generate the data voltage on the basis of the image signal IS and display an image on the basis of the data voltage. For example, the display device 140 may include a Liquid Crystal Display (LCD), an Organic Light Emitting Diode (OLED), an Active Matrix (AMOLED), a flexible display, and electronic ink.

Figure 2:
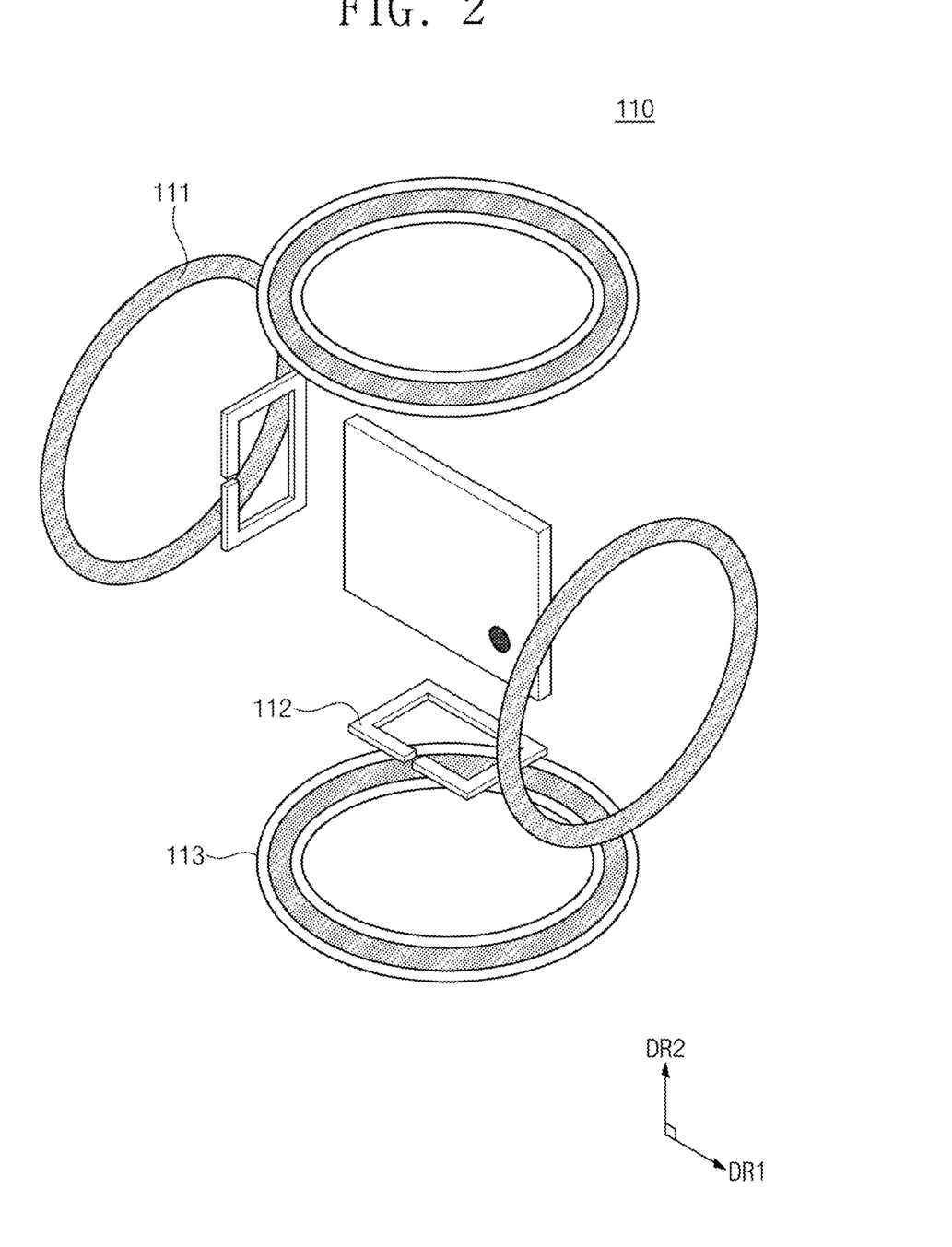
FIG. 2 is a perspective view of an image scan device of FIG. 1.

FIG. 2 is a perspective view exemplarily illustrating the image scan device of FIG. 1. In relation to FIG. 2, the image scan device 110 includes a magnetic field providing unit 111, an induced signal detection unit 112, and a scan control unit 113. The image scan device 110 detects a magnetic particle disposed therein. A scan trajectory for detecting, by the image scan device 110, the magnetic particle may be parallel to a plane provided by a first direction DR1 and a second direction DR2. The first direction DR1 is perpendicular to the second direction DR2.

The magnetic field providing unit 111 provides an AC magnetic field to the magnetic particle. The AC magnetic field may have a specific frequency. The magnetic field providing unit 111 applies a first AC magnetic field in the first direction DR1. The magnetic field providing unit 111 may include a first driving coil configured to apply the first AC magnetic field in the first direction DR1. The first driving coil may include a plurality of coils disposed to face each other in the first direction with an object disposed therebetween. The first driving coil may be a ring-type coil, but is not limited thereto. When the first driving coil is the ring-type, the AC magnetic field may be provided on the basis of the current flow in the driving coil.

The induced signal detection unit 112 detects an induced magnetic field induced from the magnetic particle. The induced magnetic field may be generated from the magnetic particle by the AC magnetic field. For example, the magnetic particle may have nonlinear magnetization characteristics. The induced magnetic field signal may be generated by the nonlinear magnetization characteristics of the magnetic particle. The induced signal detection unit 112 may include an induction coil configured to detect the induced magnetic field. The induction coil may include a first induction coil and a second induction coil. The first induction coil may detect the induced magnetic field in the first direction DR1. The second induction coil may detect the induced magnetic field in the second direction DR2. The first induction coil may be disposed separately from the object in the first direction DR1. The second induction coil may be disposed separately in the second direction DR1.

The induced signal detection unit 112 may detect the induced magnetic field to generate a magnetic particle detection signal MS. The magnetic particle detection signal MS may be an electrical signal generated based on a change amount of the induced magnetic field. The induced signal detection unit 112 may have a coil shape in order to induce an electrical signal. The induced signal detection unit 112 may provide the magnetic particle detection signal MS to the spectrum signal generation device 120 of FIG. 2.

The scan control unit 113 controls a detection area of the induced magnetic field. The detection area is defined as a field of view in which the image scan device 110 detects the induced magnetic field of the magnetic particle. The scan control unit 113 may provide a field-free point at which the magnetic field is not present so that the magnetization characteristics of the magnetic particle may be observed. The detection area is provided at the field-free point. The scan control unit 113 may include a selection coil configured to provide the field-free point. The selection coil may include a plurality of coils disposed to face each other in the second direction DR2 with an object disposed therebetween. The selection coil may be a ring-type coil, but is not limited thereto. When the selection coil includes two coils, one coil may apply a current in the clockwise direction, and the other coil may apply a current in the counter-clockwise direction. In this case, since the magnetic fields having the same polarity face each other, the field-free point may be formed at which the magnetic field is not present.

The scan control unit 113 may include a second driving coil configured to apply a second AC magnetic field in the second direction DR2. The second driving coil may include a plurality of coils disposed to face each other in the second direction with an object disposed therebetween. The second driving coil may be a ring-type coil, but is not limited thereto. When the second driving coil has the ring-type, the AC magnetic field may be provided on the basis of a current flow in the second driving coil. The scan control unit 113 may be provided as a coil in which the selection coil and the second driving coil are mixed.

The first AC magnetic field and the second AC magnetic field may have different frequencies. The scan control unit 113 may adjust the phase or frequency of the second AC magnetic field to control the detection area to be scanned in a Lissajous trajectory. Alternatively, the magnetic field providing unit 111 may adjust the phase or frequency of the first AC magnetic field to control the detection area to be scanned in a Lissajous trajectory. However, an embodiment of the inventive concept is not limited thereto, and the scan control unit may control to scan the detection area in various ways. For example, the scan control unit 113 may scan the detection area in a rectangular scan manner.

Unlike the image scan device 110 of FIG. 2, the magnetic field providing unit 111, the induction signal detection unit 112, and the scan control unit 113 may be disposed in different directions from each other. In addition, the magnetic field providing unit 111, the induction signal detection unit 112, or the scan control unit 113 may include an additional element. For example, the magnetic field providing unit 111, the induction signal detection unit 112, or the scan control unit 113 may further include coils disposed to face each other in a third direction (not shown) perpendicular to the first direction DR1 and the second direction DR2.

Figure 3:
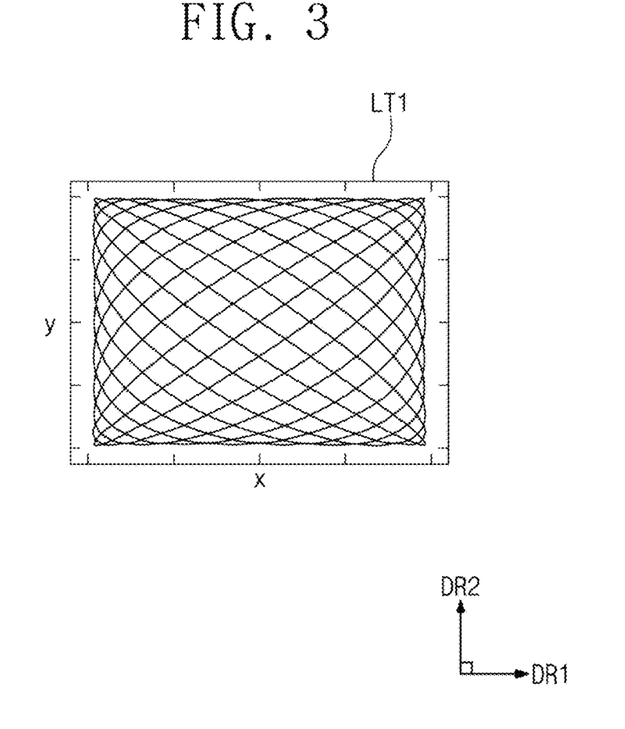
FIG. 3 is a drawing for explaining a Lissajous scan manner according to an embodiment of the inventive concept.

FIG. 3 is a drawing for explaining a Lissajous scan manner according to an embodiment of the inventive concept. In relation to FIG. 3, a horizontal axis of the Lissajous trajectory LT1 is the same as the first direction DR1 of FIG. 2. A vertical axis of the Lissajous trajectory LT2 is the same as the second direction DR2 of FIG. 2. The Lissajous trajectory LT1 is provided in the detection area generated by the scan control unit 113 of FIG. 2. The Lissajous trajectory LT1 is provided on the basis of the first AC magnetic field applied in the first direction DR1 by the magnetic field providing unit 111 and the second AC magnetic field applied in the second direction DR2 by the scan control unit 113.

When two sinusoidal waves are applied to the horizontal axis and vertical axis, and a frequency ratio of the sinusoidal waves respectively applied to the horizontal and vertical axes is adjusted to an integer ratio, a Lissajous figure may appear according to a phase difference between the two sinusoidal waves. The Lissajous trajectory LT1 may be formed on the basis of a ratio between different frequencies of the first and second AC magnetic fields. The Lissajous trajectory LT1 may provide a plurality of Lissajous cycles. The number of Lissajous cycles may be defined as the number of times of back-and-forth passes in the first direction DR1 during one period of the Lissajous trajectory LT1. For example, when the first AC magnetic field and the second AC magnetic field have the frequency ratio of 11:10, the Lissajous cycles may be 11. However, an embodiment of the inventive concept is not limited thereto, and the number of Lissajous cycles may be defined as the number of back-and-forth passes in the second direction DR2 during one period of the Lissajous trajectory LT1.

The image scan device 110 may detect the magnetic particle detection signal MS along the Lissajous trajectory LT1. The image scan device 110 may detect the magnetic particle detection signal MS in high resolution, as the number of Lissajous cycles increases. Since a scan manner according to the Lissajous trajectory LT1 results in non-uniform sampling, an additional interpolation process may be required. In relation to FIG. 3, the Lissajous trajectory LT1 is concentrated and distributed in an edge portion. Accordingly, a Lissajous trajectory having the large number of Lissajous cycles is required to ensure high resolution in the central portion.

Figure 4:
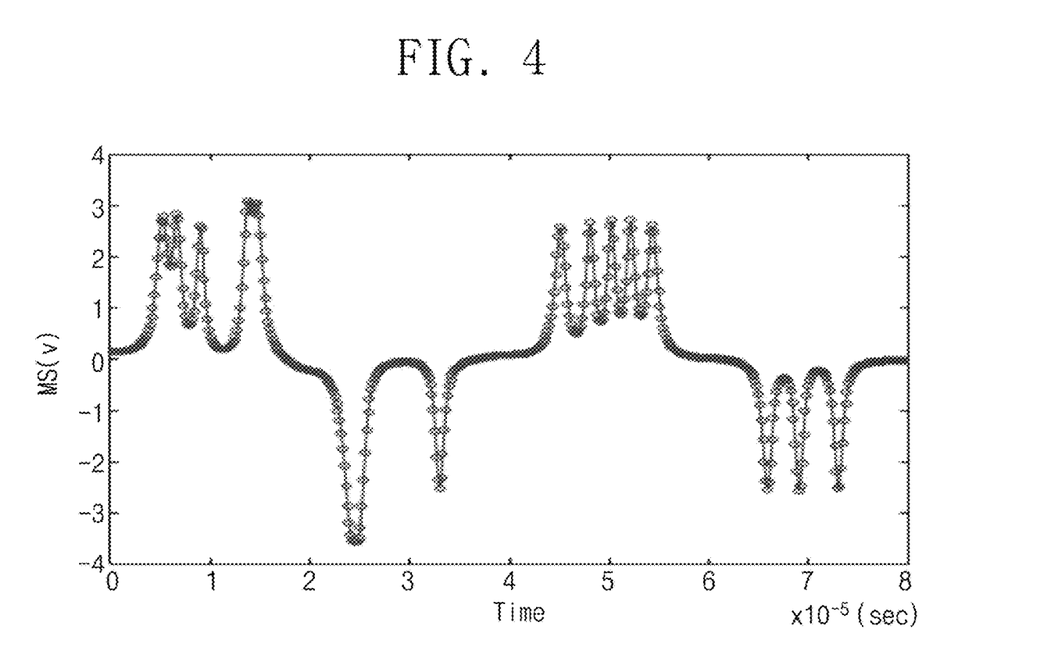
FIGS. 4 to 6 are drawings for explaining generation of a detection spectrum signal by a spectrum signal generation device according to an embodiment of the inventive concept.
Figure 5:
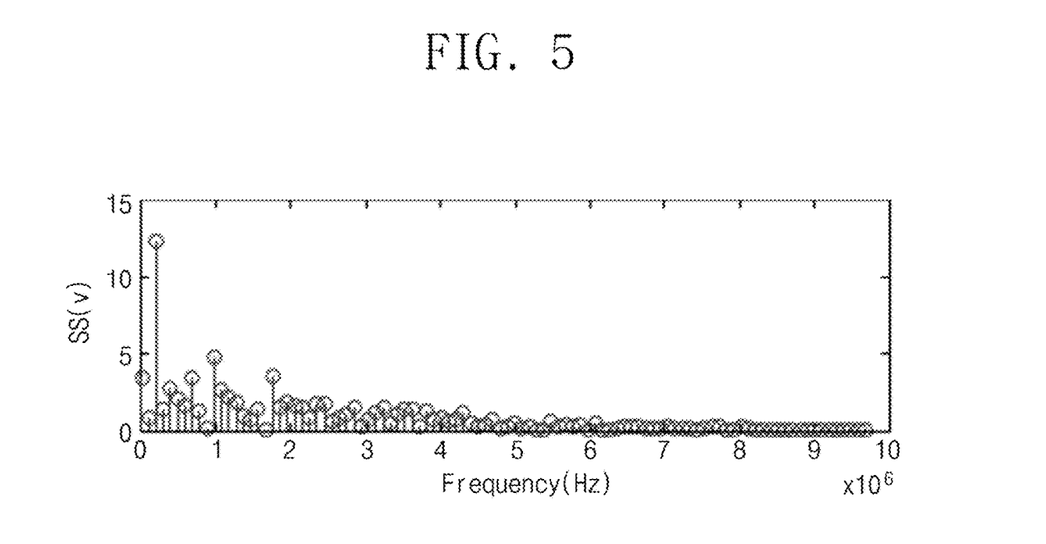
Figure 6:
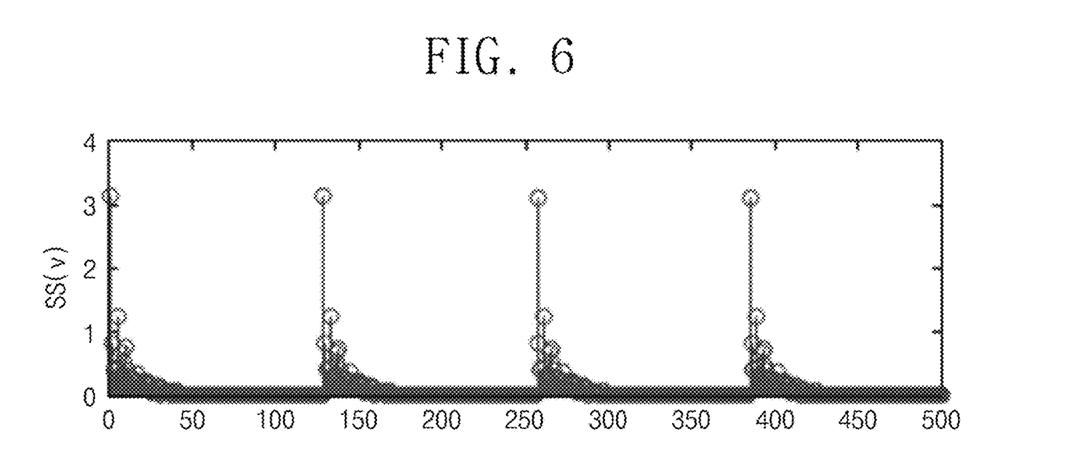

FIGS. 4 to 6 are drawings for explaining generation of the detection spectrum signal by the spectrum signal generation device according to an embodiment of the inventive concept. FIG. 4 is a graph showing the magnetic particle detection signal MS according to an embodiment of the inventive concept. In relation to FIG. 4, the vertical axis denotes time. The horizontal axis denotes a voltage value of the detected magnetic particle detection signal MS. FIG. 4 shows the magnetic particle detection signal MS up to $8\times10^{-5}$ sec for convenience, which may be understood to show a portion of the detection magnetic particle detection signal MS. As described above, in order to generate an image signal having high pixel resolution, the Lissajous trajectory LT1 is required to have a large number of Lissajous cycles and the magnetic particle detection signal MS detected according to time may include significantly many pieces of data.

FIG. 4 shows a voltage value of the magnetic particle detection signal MS that is an electrical signal detected according to time. In detail, the image scan device 110 may detect the magnetic particle detection signal MS along the Lissajous trajectory LT1. The image scan device 110 may move along the Lissajous trajectory to scan an object, and detect the magnetic particle detection signal MS. In other words, the voltage value of the magnetic particle detection signal MS at a specific time in FIG. 4 may be a voltage value of the magnetic particle detection signal MS detected on the moving path of the Lissajous trajectory at the specific time.

FIG. 5 is a graph showing a detection spectrum signal SS, when the spectrum signal generation device 120 of FIG. 1 does not use the two-dimensional transform kernel. In relation to FIG. 5, the vertical axis denotes a frequency band. The horizontal axis denotes the transformed detection spectrum signal SS. FIG. 5 is a graph in which the magnetic particle detection signal MS of FIG. 4 is one-dimensionally Fourier-transformed. For example, the detection spectrum signal SS may be generated on the basis of Equation (2).

$$V_n = \frac{1}{T^R} \int_0^{T^R} v(t) e^{-2\pi i n f^E t} dt \qquad (2)$$

Referring to FIG. 2, Vn is defined as the detection spectrum signal SS. v(t) is defined as the voltage value of the detected magnetic particle detection signal MS. $f^E$ is defined as an excitation frequency for generating the magnetic particle detection signal MS from the nonlinear magnetization characteristics of superparamagnetism. $T^R$ is defined as time taken to scan the Lissajous trajectory. When Equation (2) is calculated using the Fourier transform kernel, the detection spectrum signal SS may be generated on the basis of Equation (3).

$$V_n = F_{1D}[v(t)] \qquad (3)$$

Referring to Equation (3), $F_{1D}$ may be defined as the Fourier transform kernel. In this case, the voltage value v(t) of the magnetic particle detection signal MS is converted to a matrix. v(t) may be represented as a column vector for the voltage value according to time. The Fourier transform kernel may be a matrix having the number of rows as many as corresponding to a data amount of the detection spectrum signal SS and columns having the size corresponding to the data amount of the magnetic particle detection signal MS. The detection spectrum signal SS, Vn may be represented as a column vector type.

The detection spectrum signal SS of FIG. 5 is a signal generated by Fourier-transforming at once the magnetic particle detection signals MS measured with respect to the entire Lissajous trajectory. Such a detection spectrum signal SS is represented as a harmonized spectrum having a multiple of the excitation frequency $f^E$. The detection spectrum signal SS is concentrated and distributed in a relatively low frequency band. The detection spectrum signal SS has a type that spectrum data having the magnitude equal to or greater than a threshold value is concentrated in a low frequency band. The threshold value may be defined as a low limit of the magnitude of the spectrum data required to recover the image. When the detection spectrum signal SS is concentrated in the low frequency band, image recovery performance is reduced due to the magnetization characteristics of the magnetic particle and geometric characteristics with respect to the entire Lissajous trajectory.

When the detection area is provided relatively smaller, the data amount itself of the magnetic particle detection signal MS is small. In this case, although the detection spectrum signal SS is distributed in the low frequency band, the image recovery performance is not largely reduced. However, when the detection area is provided largely, the data amount for the image recovery is required to be increased. When the number of Lissajous cycles is large, the data amount of the magnetic particle detection signal MS increases. However, when the detection spectrum signal SS is generated on the basis of one-dimensional Fourier transform, the data amount for the image recovery is largely reduced. In other words, the data amount provided to the image recovery device 130 is reduced. Accordingly, the image recovery performance for generating the image signal IS is reduced in the image recovery device 130.

FIG. 6 is a graph showing a detection spectrum signal SS, when the spectrum signal generation device 120 of FIG. 1 uses the two-dimensional transform kernel. Referring to FIG. 6, the vertical axis denotes a frequency band. The horizontal axis denotes the transformed detection spectrum signal SS. FIG. 6 is a graph of the magnetic particle detection signal MS of FIG. 4 generated using a two-dimensional Fourier transform kernel. The two-dimensional Fourier transform kernel may be a matrix for performing the Fourier transform on the magnetic particle detection signal MS. The Fourier transform kernel may be generated on the basis of Equation (4).

$$F_{2D} = F_X \otimes F_Y \quad (4)$$

Referring to Equation (4), $F_{2D}$ may be defined as the two-dimensional Fourier transform kernel. $F_X$ is defined as a first matrix generated on the basis of a component of the first direction DR1 of the magnetic particle detection signal MS. $F_Y$ is defined as a second matrix generated on the basis of a component of the second direction DR2 of the magnetic particle detection signal MS. When elements included in the first matrix Fx are enumerated in a column vector and elements included in the second matrix Fy are enumerated in a column vector, the column vectors are orthonormal to each other. The two-dimensional Fourier transform kernel $F_{2D}$ is defined as Kronecker delta multiplication of the first matrix $F_X$ and the second matrix $F_Y$. The Kronecker delta multiplication means matrix calculation as Equation (5).

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad (5)$$

Referring to Equation (5), the size of the two-dimensional kernel $F_{2D}$ depends on the sizes of the first matrix $F_X$ and the second matrix $F_Y$. For example, when the first matrix $F_A$ and the second matrix $F_Y$ has the size of m×n, the size of the two-dimensional Fourier transform kernel $F_{2D}$ is $(m \times n)^2$. The two-dimensional Fourier transform kernel $F_{2D}$ generated based on Equation (5) transforms the magnetic particle detection signal MS to the detection spectrum signal SS on the basis of Equation (6).

$$V_n = (F_X \otimes F_Y)[v(t)]$$

$$S_n = (F_X \otimes F_Y)[v(t)] \quad (6)$$

Referring to Equation (6), the magnetic particle detection signal MS, v(t) is transformed to the detection spectrum signal SS, Vn on the basis of the two-dimensional transform kernel. The detection spectrum signal SS, Vn may be generated on the basis of matrix multiplication calculation of the two-dimensional Fourier transform kernel and the magnetic particle detection single MS, v(t). v(t) may represent the voltage value of the magnetic particle detection signal MS in a column vector type. The Fourier transform kernel may be a matrix having the number of rows as many as corresponding to a data amount of the detection spectrum signal SS and the number of columns corresponding to a data amount of the magnetic particle detection signal MS. The detection spectrum signals SS, Vn may represent a voltage value according to a frequency in a column vector type.

Similarly to the detection spectrum signal SS, the system matrix Sn may be generated using the two-dimensional Fourier transform kernel. For example, the image scan device 110 spatially scans the magnetic particle to provide the measured signal to the spectrum signal generation device 120, and the spectrum signal generation device 120 may transform the measured signal to the system matrix Sn using the two-dimensional Fourier transform kernel. The system matrix Sn may be generated in advance using a correction phantom, etc., before generation of the detection spectrum signal SS. The system matrix Sn may be continuously updated, since a dynamic condition and the magnetization characteristics of the image scan device 110 are all considered.

The detection spectrum signal SS of FIG. 6 is periodically distributed over the entire frequency band. The number of periodically repeated waveforms is equal to the number of Lissajous cycles in the detection spectrum signal SS. Since the two-dimensional transform kernel is provided by Kronecker delta multiplication of the first and second matrices, the number of waveforms repeated in the detection spectrum signal SS may be determined in dependence on the number of rows of the first matrix. In addition, the number of pieces of spectrum data in repeated waveforms may be determined in dependence on the number of rows of the second matrix.

In comparison to the detection spectrum signal of FIG. 5, the detection spectrum signal SS of FIG. 6 is not concentrated in a frequency band in which the magnitude of the spectrum data is low, but is distributed over the entire frequency band. Accordingly, the number of pieces of spectrum data having the magnitude equal to or greater than the threshold value increases in the detection spectrum signal SS. In other words, the number of pieces of spectrum data required to recover the image is ensured. Accordingly, the image recovery performance in the image system 100 is improved.

Figure 7:
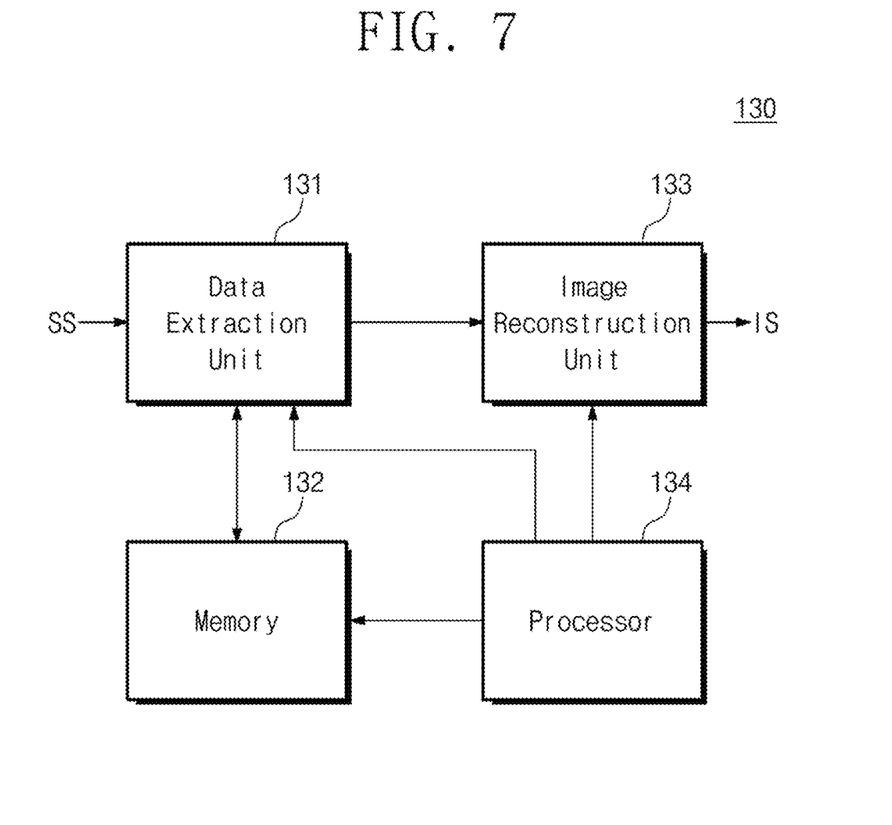
FIG. 7 is a block diagram of the image recovery device of FIG. 1.

FIG. 7 is a perspective view exemplarily illustrating the image scan device of FIG. 1. In relation to FIG. 7, the image recovery device 130 includes a data extraction unit 131, a memory 132, an image reconstruction unit 133, and a processor 134. The image recovery device 130 is illustrated to receive the detection spectrum signal SS from the spectrum signal generation device 120, but is not limited thereto. The image recovery device 130 may receive the system matrix Sn generated based on Equation 6 from the spectrum signal generation device 120.

The data extraction unit 131 receives the detection spectrum signal SS from the spectrum signal generation device 120. The data extraction unit 131 extracts spectrum data having the magnitude equal to or greater than a threshold value among spectrum data included in the detection spectrum signal SS. As described in relation to FIG. 6, the detection spectrum signal SS is periodically repeated as many as the number of Lissajous cycles. The data extraction unit 131 extracts a spectrum range in which the magnitude of spectrum data is equal to or greater than the threshold value among the spectrum data corresponding to a Lissajous cycle. In other words, the data extraction unit 131 extracts spectrum ranges as many as the number of Lissajous cycles. The spectrum range includes a plurality of pieces of the spectrum data.

The data extraction unit 131 may receive the system matrix Sn from the spectrum signal generation device 120. Similar to extraction of the detection spectrum signal SS, the data extraction unit 131 extracts a part of the spectrum data included in the system matrix Sn. In relation to FIG. 1, the system matrix Sn and the detection spectrum signal SS, Vn may have the same number of rows for matrix calculation. Accordingly, the data extraction unit 131 may extract spectrum data so that the numbers of rows in the detection spectrum signal SS and the system matrix Sn are the same. The data extraction unit 131 may provide the extracted spectrum data to the image reconstruction unit 133 or the memory 132.

The memory 132 may receive the spectrum data extracted from the data extraction unit 131. The memory 132 may receive the detection spectrum signal SS or system matrix Sn before being extracted from the data extraction unit 131. Although not shown in the drawings, the memory 132 may receive the image signal IS from the image reconstruction unit 133. The memory 132 may store the received detection spectrum signal SS, the system matrix Sn and the extracted spectrum data, etc. The memory 132 may receive the system matrix Sn to update the existing system matrix.

The memory 132 may include at least one among non-volatile memory devices such as a read only memory (ROM), a programmable ROM (PROM), an Electrically Programmable ROM (EPROM), an Electrically Erasable and Programmable ROM (EEPROM), a Flash memory, Phase-change RAM (PRAM), a Magnetic RAM (MRAM), a Resistive RAM (RRAM), a Ferroelectric RAM (FRAM), or the like. Alternatively, the memory 132 may include at least one among volatile memory devices such as a static RAM (SRAM), a Dynamic RAM (DRAM), a Synchronous RAM (SRAM) or the like.

The image reconstruction unit 133 receives the spectrum data extracted from the detection spectrum signal SS, and the spectrum data extracted from the system matrix Sn. The image reconstruction unit 133 generates the image signal IS on the basis of the spectrum data extracted from the detection spectrum signal SS and the system matrix Sn. The image reconstruction unit 133 may acquire the image signal IS by obtaining a solution of Equation (1). The image reconstruction unit 133 may generate the image signal IS using an optimization algorithm such as singular value decomposition (SVD).

The processor 134 may perform a function of a central control device of the image recovery device 130. The processor 134 may perform a control operation and calculation required for generating the image signal IS. For example, the data extraction unit 131 may receive the detection spectrum signal SS and the system matrix Sn from the spectrum signal generation device 120 according to the control of the processor 134, and extract the spectrum data. The image reconstruction unit 133 may receive the spectrum data from the data extraction unit 131 according to a control of the processor 134, and execute the image reconstruction algorithm. The processor 134 may use a calculation space of the memory 132.

Figure 8:
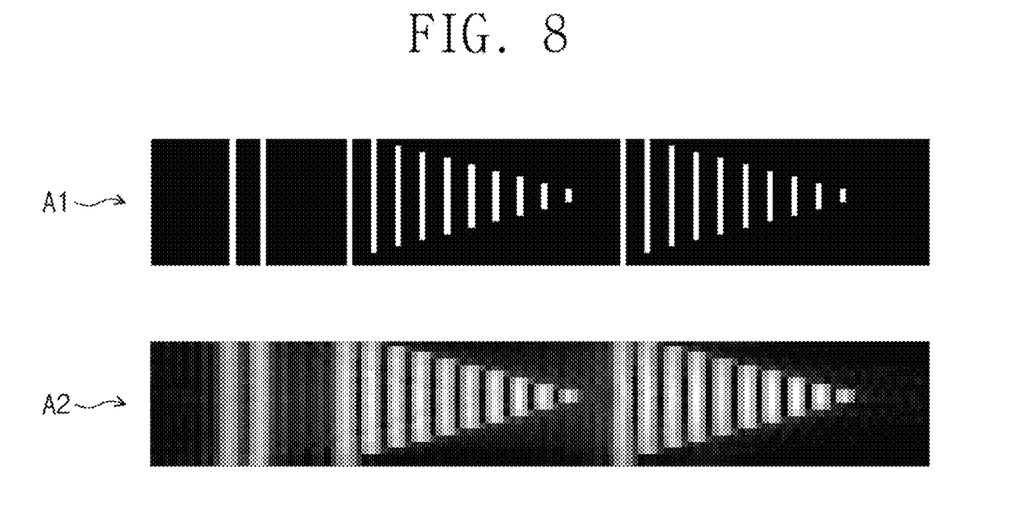
FIG. 8 is a drawing showing a two-dimensional image recovered by an imaging system of FIG. 1.

FIG. 8 is a drawing showing a two-dimensional image recovered by the imaging system of FIG. 1. In relation to FIG. 8, the magnetic particle may be arranged in a two-dimensional space like a first image A1. When the image is recovered by the image system 100 of FIG. 1, the recovered image may be the same as a second image A2. A distribution of magnetic fields such as the first image A1 may be displayed as the second image A2 on the basis of the image signal IS generated using the two-dimensional Fourier transform kernel and the image recovery device 130. The second image A2 may be displayed on the image device 140.

When the magnetic particle detection signal MS is transformed to the detection spectrum signal SS by the spectrum signal generation device 120 using the two-dimensional transform kernel, the distribution of the magnetic particles may be clearly recovered like the second image A2. Such an image system 100 may be used as a medical image system configured to diagnose a disease of a human body.

Figure 9:
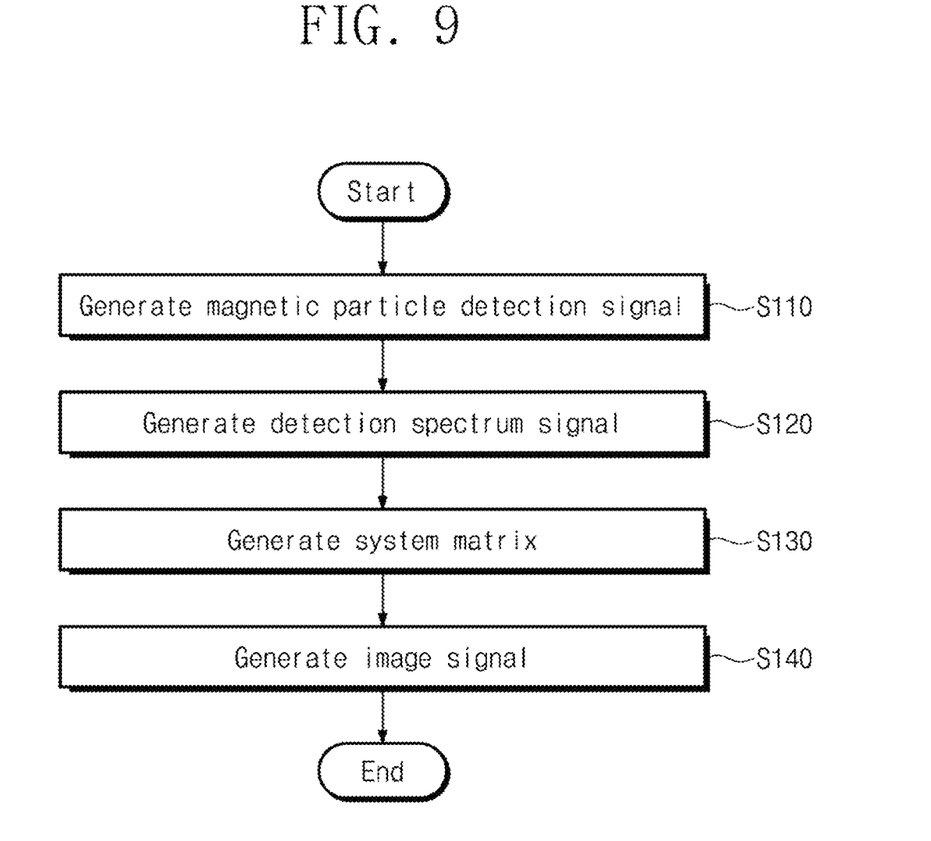
FIG. 9 is a flowchart of an image reconstruction method according to an embodiment of the inventive concept.

FIG. 9 is a flowchart of an image reconstruction method according to an embodiment of the inventive concept. The image reconstruction method of FIG. 9 is performed in the image system 100 of FIG. 1. In operation S110, the image system 100 generates a magnetic particle detection signal MS. Operation S110 may be performed in the image scan device 110. The image scan device 110 may detect a induced magnetic field induced from a magnetic particle along a Lissajous trajectory to generate the magnetic particle detection signal MS.

In detail, the operation of generating the magnetic particle detection signal MS may include an operation of applying an AC magnetic field and an operation of scanning the induced magnetic field. The operation of applying the AC magnetic field may be performed in the magnetic field providing unit 111. The magnetic field providing unit 111 applies the AC magnetic field to a magnetic particle. The operation of scanning the induced magnetic field may be performed by the induced signal detection unit 112. The induced signal detection unit 112 scans, along the Lissajous trajectory, the induced magnetic field induced from the magnetic particle on the basis of the AC magnetic field. The image scan device 110 may generate the magnetic particle detection signal MS, which is an electrical signal, on the basis of the induced magnetic field.

In operation S120, the image system 100 generates the detection spectrum signal SS. Operation S120 may be performed in the spectrum signal generation device 120. The spectrum signal generation device 120 calculates the two-dimensional Fourier transform kernel and a column vector of the magnetic particle detection signal MS to generate the detection spectrum signal SS. The two-dimensional Fourier transform kernel is generated by Kronecker delta multiplication of the first matrix on the basis of a component of the first direction DR1 of the magnetic particle detection signal MS and the second matrix on the basis of a component of the second direction DR2 of the magnetic particle detection signal MS.

In operation S130, the image system 100 generates the system matrix. Operation S130 may be performed by the spectrum signal generation device 120. The spectrum signal generation device 120 generates the system matrix on the basis of the two-dimensional Fourier transform kernel. The generation process of the system matrix may be identical to a process of using the two-dimensional transform kernel in order to generate the detection spectrum signal SS. Operation S130 may be performed before operation S120, or be performed in advance before operation S110.

In operation S140, the image system 100 generates the image signal IS. Operation S140 may be performed in the image recovery device 130. The image recovery device 130 may generate the image signal IS on the basis of the detection spectrum signal SS and the system matrix. The image recovery device 130 may extract the spectrum data having the magnitude equal to or greater than a threshold value from the detection spectrum signal SS. The image recovery device 130 may generate the image signal IS on the basis of the extracted spectrum data.

According to embodiments of the inventive concept, an imaging system and an image reconstruction method using the same may acquire a spectrum signal periodically distributed over the entire frequency band using a two-dimensional Fourier transform kernel, and ensure a data amount for image reconstruction.

The foregoing description is about detailed examples for practicing the inventive concept. The present disclosure includes not only the above-described embodiments but also simply changed or easily modified embodiments. In addition, the present disclosure may also include technologies obtained by easily modifying and practicing the above-described embodiments.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. An image system comprising:
   an image scan device configured to generate a magnetic particle detection signal on a basis of an induced magnetic field induced from a magnetic particle;
   a spectrum signal generation device configured to transform the magnetic particle detection signal to a detection spectrum signal on a basis of a two-dimensional Fourier transform kernel generated by Kronecker delta multiplication of a first matrix based on a first directional component of the magnetic particle detection signal and a second matrix based on a second directional component of the magnetic particle detection signal; and
   an image recovery device configured to generate an image signal on a basis of the detection spectrum signal and a system matrix.

2. The image system of claim 1, wherein the image scan device detects the magnetic particle detection signal along a Lissajous trajectory.

3. The image system of claim 2, wherein the spectrum signal generation device transforms the magnetic particle detection signal so as to have a waveform repeated as many as a number of Lissajous cycles that is defined as a number of times of back-and-forth passes in the first direction during one period of the Lissajous trajectory.

4. The image system of claim 1, wherein the spectrum signal generation device generates the system matrix on a basis of the two-dimensional Fourier transform kernel.

5. The image system of claim 1, wherein the image scan device comprises:
   a magnetic field providing unit configured to apply an AC magnetic field to the magnetic particle;
   an induced signal detection unit configured to detect the induced magnetic field induced from the magnetic particle; and
   a scan control unit configured to control a detection area of the induced magnetic field.

6. The image system of claim 5, wherein the magnetic field providing unit comprises a first driving coil configured to apply a first AC magnetic field in the first direction, and the scan control unit comprises:
   a second driving coil configured to apply a second AC magnetic field in the second direction; and
   a selection coil configured to control the detection area.

7. The image system of claim 6, the scan control unit controls a frequency of the second AC magnetic field to form the Lissajous trajectory in the detection area.

8. The image system of claim 1, wherein the spectrum signal generation device generates a column vector on a basis of a voltage value of the magnetic particle detection signal with respect to time, and generates the detection spectrum signal on a basis of matrix multiplication calculation of the column vector and the two-dimensional Fourier transform kernel.

9. The image system of claim 1, wherein the first direction and the second direction are perpendicular to each other, and
   a column vector based on elements of the first matrix and
   a column vector based on elements of the second matrix are orthonormal to each other.

10. The image system of claim 1, wherein the image recovery device comprises:
    a data extraction unit configured to extract spectrum data, having a magnitude equal to or greater than a threshold value, in the detection spectrum signal; and
    an image reconstruction unit configured to generate the image signal on a basis of the spectrum data.

11. The image system of claim 10, wherein the data extraction unit extracts data, having the magnitude equal to or greater than the threshold value, in the system matrix, and
    the image reconstruction unit generates the image signal on a basis of the spectrum data extracted from the detection spectrum signal and the data extracted from the system matrix.

12. An image reconstruction method, comprising:
    detecting, by an image scan device, an induced magnetic field induced from a magnetic particle along a Lissajous trajectory to generate a magnetic particle detection signal;
    calculating, by a spectrum signal generation device, a two-dimensional Fourier transform kernel generated based on a plane on which the Lissajous trajectory travels and a column vector of the magnetic particle detection signal with respect to time to generate a detection spectrum signal;
    generating, by the spectrum signal generation device, a system matrix on a basis of the two-dimensional Fourier transform kernel; and
    generating, by an image recovery device, an image signal on a basis of the detection spectrum signal and the system matrix,
    wherein the two-dimensional Fourier transform kernel is generated by Kronecker-delta-multiplying a first matrix on a basis of a component of a first direction of the magnetic particle detection signal by a second matrix on a basis of a component of a second direction of the magnetic particle detection signal, and wherein the first and second directions are perpendicular to each other on the plane on which the Lissajous trajectory travels.

13. An image reconstruction method comprising:
    detecting, by an image scan device, an induced magnetic field induced from a magnetic particle along a Lissajous trajectory to generate a magnetic particle detection signal;
    calculating, by a spectrum signal generation device, a two-dimensional Fourier transform kernel generated based on a plane on which the Lissajous trajectory travels and a column vector of the magnetic particle detection signal with respect to time to generate a detection spectrum signal;

generating, by the spectrum signal generation device, a system matrix on a basis of the two-dimensional Fourier transform kernel; and generating, by an image recovery device, an image signal on a basis of the detection spectrum signal and the system matrix, wherein the detection spectrum signal has a plurality of spectrum ranges in which spectrum data has a magnitude equal to or greater than a threshold value, wherein a number of the plurality of spectrum ranges corresponds to a number of Lissajous cycles defined as a number of times of back-and-forth passes of the Lissajous trajectory in a first direction.

14. The image reconstruction method of claim 13, wherein in the generating of the image signal, the plurality of spectrum ranges are extracted from the detection spectrum signal, the plurality of spectrum ranges comprising the spectrum data having the magnitude equal to or greater than the threshold value, and the image signal is generated based on the extracted spectrum data.

\* \* \* \* \*